US011168381B2

(12) United States Patent
Cerea

(10) Patent No.: US 11,168,381 B2
(45) Date of Patent: Nov. 9, 2021

(54) PROCESS FOR UPGRADING WASTE POWDERS FROM MINES, CONTAINING IRON OXIDES

(71) Applicant: AMBIENTE E NUTRIZIONE S.R.L., Rozzano (IT)

(72) Inventor: Giuseppina Cerea, Rozzano (IT)

(73) Assignee: Ambiente E Nutrizione S.R.L., Milan (IT)

( * ) Notice: Subject to any disclaimer, the term of this patent is extended or adjusted under 35 U.S.C. 154(b) by 524 days.

(21) Appl. No.: 15/029,685

(22) PCT Filed: Oct. 16, 2014

(86) PCT No.: PCT/IB2014/065354
§ 371 (c)(1),
(2) Date: Apr. 15, 2016

(87) PCT Pub. No.: WO2015/056198
PCT Pub. Date: Apr. 23, 2015

(65) Prior Publication Data
US 2016/0265081 A1 Sep. 15, 2016

(30) Foreign Application Priority Data

Oct. 17, 2013 (IT) .......................... MI2013A001732

(51) Int. Cl.
*C22B 1/245* (2006.01)
*C22B 1/244* (2006.01)
(Continued)

(52) U.S. Cl.
CPC .............. *C22B 1/005* (2013.01); *C22B 1/243* (2013.01); *C22B 1/244* (2013.01); *C22B 1/245* (2013.01); *Y02P 10/20* (2015.11)

(58) Field of Classification Search
None
See application file for complete search history.

(56) References Cited

U.S. PATENT DOCUMENTS 2,775,566 A * 12/1956 Crowley ................. C22B 1/244
524/318
3,377,146 A 4/1968 Von Stroh
(Continued)

FOREIGN PATENT DOCUMENTS

AU          435114       4/1973
CN        1074714 A  *  7/1993
(Continued)

OTHER PUBLICATIONS

Kawaguchi et al. "Promoter material and inhibitor material for dioxins formation in sintering process." Tetsu-to-Hagan. 88 (2002) 7, 370-377. (Year: 2002).*
(Continued)

*Primary Examiner* — Paul A Wartalowicz
*Assistant Examiner* — Stephani Hill
(74) *Attorney, Agent, or Firm* — Silvia Salvadori, P.C.; Silvia Salvadori

(57) ABSTRACT

A process for upgrading waste powders of the mining industry containing iron oxides is described, which includes preparing a mixture containing powder based on iron oxides, an aqueous dispersion of a thermosetting resin and optionally carbon powder, and a catalyst of acidic nature; kneading the mixture at a temperature between 5 and 100° C. to form a homogeneous paste, and granulating such homogeneous paste at a temperature between 100 and 300° C., thus obtaining granules of powder based on iron oxides and optionally carbon powder bound by the resin that has been polymerized.

7 Claims, 1 Drawing Sheet

(51) Int. Cl.
*C22B 1/243* (2006.01)
*C22B 1/00* (2006.01)

(56) References Cited

U.S. PATENT DOCUMENTS

| | | | | |
|---|---|---|---|---|
| 4,362,559 | A * | 12/1982 | Perez | C21C 5/28 75/560 |
| 4,497,661 | A * | 2/1985 | Valenti | C21C 1/08 75/312 |
| 4,704,230 | A * | 11/1987 | Blackmore | C04B 35/532 252/502 |
| 4,919,847 | A * | 4/1990 | Barletta | C11D 1/22 427/212 |
| 5,002,607 | A * | 3/1991 | Flesher | C22B 1/2406 75/767 |
| 5,409,643 | A * | 4/1995 | Vezzani | C01B 33/325 264/12 |
| 5,906,793 | A * | 5/1999 | Vezzani | C05F 9/00 422/1 |
| 5,935,296 | A * | 8/1999 | Rees | C22B 1/244 75/770 |
| 6,248,707 | B1 * | 6/2001 | Doetsch | B01J 2/00 423/415.2 |
| 6,451,084 | B1 * | 9/2002 | Petrey, Jr. | C22B 1/244 75/321 |
| 2002/0162242 | A1 * | 11/2002 | Cerea | B01F 13/1013 34/359 |
| 2004/0011707 | A1 * | 1/2004 | Cerea | B01D 3/14 208/347 |
| 2007/0166420 | A1 | 7/2007 | Pammer et al. | |
| 2009/0176982 | A1 * | 7/2009 | Vezzani | C07D 251/62 544/222 |
| 2014/0190310 | A1 * | 7/2014 | Tooge | C22B 1/244 75/311 |

FOREIGN PATENT DOCUMENTS

| | | | | |
|---|---|---|---|---|
| EP | 0508166 | A2 | 10/1992 | |
| EP | 1462507 | A1 * | 9/2004 | C10L 5/361 |
| JP | S56051535 | A * | 5/1981 | |
| JP | H03-006334 | * | 1/1991 | |
| JP | 2004035951 | | 2/2004 | |
| JP | 2007270260 | | 10/2007 | |
| JP | 2007270260 | A * | 10/2007 | |
| JP | 2009030115 | | 2/2009 | |
| WO | 2002034696 | A2 | 5/2002 | |
| WO | WO-2004017706 | A2 * | 3/2004 | C08K 3/34 |
| WO | WO-2013010629 | A1 * | 1/2013 | C22B 1/243 |

OTHER PUBLICATIONS

JP 2007-270260 machine translation (Year: 2007).*
JPH03-006334 machine translation (Year: 1991).*
JP S56-051535 English Abstract (Year: 1981).*
EP 1462507 machine translation (Year: 2004).*
CN 1074714 machine translation (Year: 1993).*
International Search Report and Written Opinion of PCT/IB2014/065354 dated May 27, 2015.
Invitation to pay additional fees for PCT/IB2014/065354 of Jan. 19, 2015.

* cited by examiner

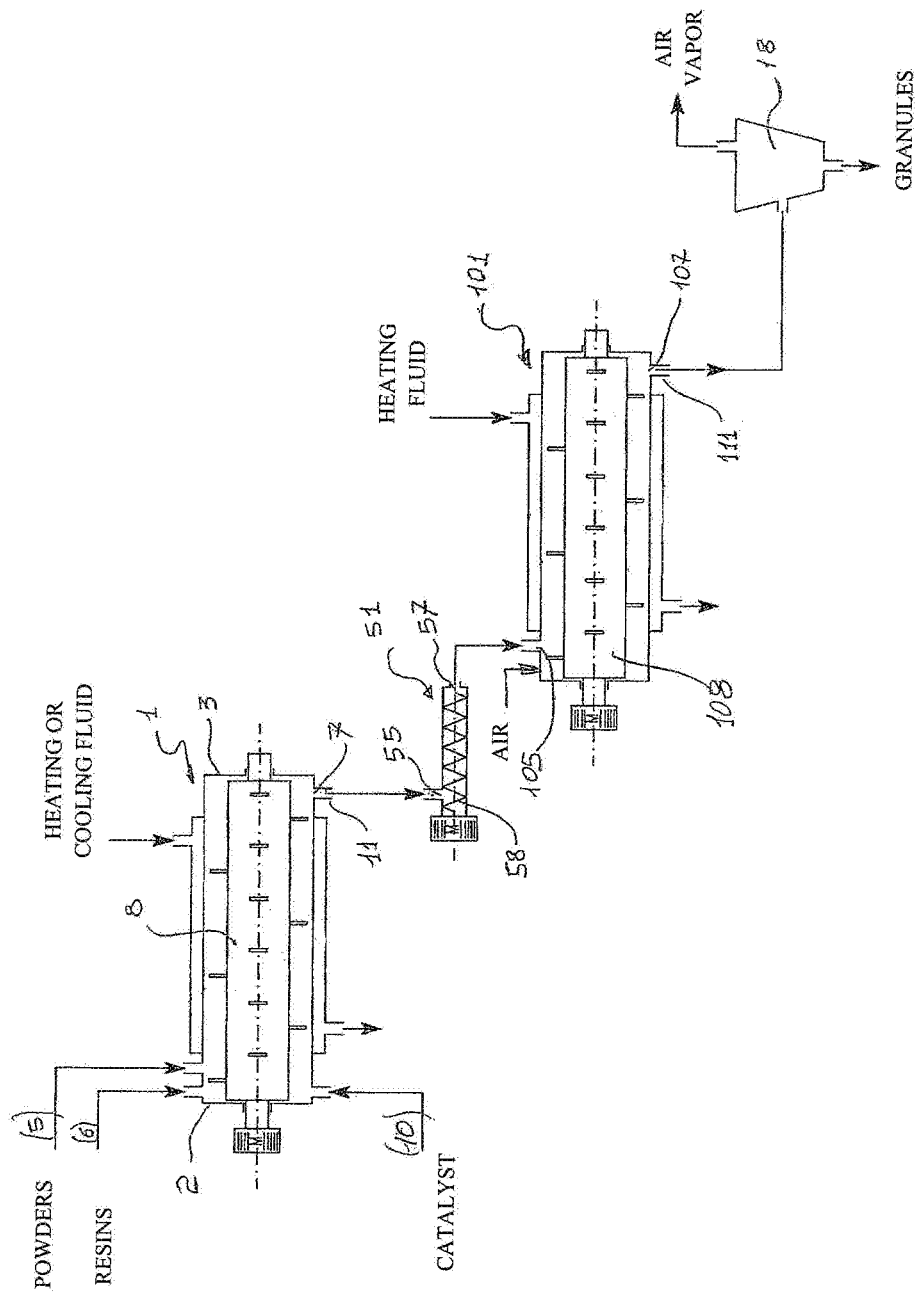

PROCESS FOR UPGRADING WASTE POWDERS FROM MINES, CONTAINING IRON OXIDES

This application is a U.S. national stage of PCT/IB2014/065354 filed on 16 Oct. 2014, which claims priority to and the benefit of Italian Application No. MI2013A001732, filed on 17 Oct. 2013, the contents of which are incorporated herein by reference in their entireties.

FIELD OF APPLICATION

In its widest aspect, the present invention relates to a process for upgrading iron oxide-based waste powders from mines.

Still more particularly, the present invention relates to a process of the above-mentioned type, in which granules are obtained, which contain iron oxides with such particle size and rheological characteristics as to allow an easy handling thereof, as well as being useful to be fed to an induction furnace or a blast furnace for the production of metal iron and alloys thereof.

The present invention also relates to a plant for implementing the process of the present invention.

BACKGROUND OF THE ART

It is known that the activity of extracting iron ore results in the production of many waste powders.

Such powders are mainly composed of iron oxides, such as ferrous oxide (FeO) or wüstite; ferrous-ferric oxide ($Fe_3O_4$) or magnetite; ferric oxide ($Fe_2O_3$) or hematite or maghemite; goethite; akaganeite; lepidocrocite; feroxyhyte; ferrihydrite; schwertmannite; limonite.

It is desirable to recover and re-process these powders so as to extract the metal iron contained therein.

Also from an environmental viewpoint, it is preferable to reuse such powders containing iron oxides rather than extracting more iron ores from the territory. In recent years, in fact, the interest in recovering and recycling the residual powders has grown. This interest has been mainly dictated by the environmental and recovery regulations that are imposed to the mining companies in many countries. In fact, the mining methods of the past have had devastating effects on the territory and the public health, due to the concentration of chemical elements on a wide area, in particular in the case where the contaminated area is crossed by water canals.

However, it has to be considered that the powders based on iron oxides can be difficult and dangerous to transport, also because they may have a thixotropic behavior. Therefore, the disposal of these powders necessarily requires the use of pre-existing facilities or the installation in situ of a dedicated plant for the conversion of the powders to a state in which they can be safely transported. This obviously involves additional costs.

Of course, given the huge amounts of these powders to be treated, there is the need that the conversion treatment can be performed by an in-situ process that is quick, easy, safe, high-performance, and economical as possible, both in terms of operating costs and installation costs.

Apart from the problems encountered in the transport and handling of the above-mentioned powders containing iron oxides, the too small size of the powder particles does not allow an efficient use thereof, for example, in induction furnaces. In fact, such furnaces exhibit improved performance and efficiency if the ferrous material that is fed is of larger sizes, because in that case a higher electrical resistance is obtained.

Therefore, there is the need to provide a process for upgrading waste powders based on iron oxides which is simple, economical, efficient, high-yield, safe and applicable in situ, and which allows providing a material suitable to be fed to induction furnaces for obtaining iron and alloys thereof.

SUMMARY OF THE INVENTION

The present invention meets the above-mentioned needs by a process for upgrading waste powders based on iron oxides, which comprises the steps of:

a) preparing a mixture comprising a powder based on iron oxides, an aqueous dispersion of a thermosetting resin and optionally also carbon powder and a catalyst of acidic nature, wherein the mixture is prepared by providing a turbomixer comprising a cylindrical tubular body with a horizontal axis, provided with at least one opening for the introduction of said powder based on iron oxides, of optional carbon powder, of said aqueous dispersion of a thermosetting resin and an optional solution of said acid catalyst and at least one opening for the discharge of the mixed product, an optional heating or cooling jacket to bring the temperature of said tubular body to a predetermined temperature, and a bladed rotor, rotatably supported in the cylindrical tubular body;

b) feeding continuous flows of said powder based on iron oxides and optionally of said carbon powder into said turbomixer, in which the bladed rotor is rotated at a speed greater than or equal to 150 rpm;

c) feeding into said turbomixer, together with said powder flows, a continuous flow of an aqueous dispersion of said thermosetting resin, which is dispersed in minute droplets, and optionally a continuous flow of a solution of said acid catalyst;

d) kneading said mixture by centrifuging said flows against the turbomixer inner wall, with the formation of a thin, dynamic, highly turbulent tubular fluid layer, in which the particles of powder based on iron oxides and optionally carbon powder, as well as the droplets of said thermosetting resin aqueous dispersion and optionally said acid catalyst solution are mechanically kept in intimate contact by the blades of said bladed rotor, while advancing in substantial contact with said turbomixer inner wall toward the discharge opening;

e) discharging from the discharge opening a continuous flow of a homogeneous paste containing said powder of iron oxides and optionally said carbon powder and optionally also said catalyst, embedded in said resin;

f) granulating said homogeneous paste by providing a turbogranulator, comprising a cylindrical tubular body with a horizontal axis, provided with at least one inlet opening and at least one discharge opening, a heating jacket to bring the temperature of said tubular body to a predetermined temperature, a bladed rotor, rotatably supported in the cylindrical tubular body;

feeding said paste into said turbogranulator through the at least one inlet opening, the turbogranulator inner wall being maintained at a temperature of 100-300° C. by means of said heating jacket and the bladed rotor being rotated at a speed of at least 250 rpm;

centrifuging and advancing said paste inside the turbogranulator by the action of said bladed rotor, which causes the formation of small masses agglomerated by said thermosetting resin, which, upon centrifugation against the heated inner wall, crosslink to form spheroidal granules; and g) discharging a continuous flow of granules from the outlet opening (107) of the turbogranulator.

Preferably, such powder based on iron oxides comprises one or more oxides selected from the group comprising: ferrous oxide (FeO) or wüstite; ferrous-ferric oxide ($Fe_3O_4$) or magnetite; ferric oxide ($Fe_2O_3$) or hematite or maghemite; goethite; akaganeite; lepidocrocite; feroxyhite; ferrihydrite; schwertmannite; limonite.

Generally, such powder based on iron oxides has a size equal to or less than 10 μm (in diameter). Preferably, the powder of iron oxides is present in the above-mentioned mixture in an amount comprised between 70 and 90%, more preferably of 85%, by weight of the total weight of the mixture.

Preferably, such powders of carbon, where present, are contained in the above-mentioned mixture in an amount comprised between 7 and 20%, more preferably of 10%, by weight of the total weight of the mixture.

The mixture of step a) can also comprise compounds of manganese, aluminum, copper or other elements able to form an alloy with the elements present in the mixture.

Preferably, the above-mentioned thermosetting resin is a urea or urea-melamine resin or a phenol resin. Urea and urea-melamine resins are more preferred. Preferably, the resin is in the form of an aqueous dispersion or solution.

Preferably, such resin is present in the mixture in an amount comprised between 3 and 10%, suitably between 5 and 10% by weight of the total weight of the mixture of step a).

Preferably, the catalyst of acidic nature is an ammonium salt with a strong acid, suitably, ammonium sulfate or ammonium chloride.

Preferably, the catalyst is present in the mixture of the above step a) in an amount comprised between 3 and 10% by weight of the total weight of the mixture.

Preferably, the mixture of step a) has a dry matter percentage equal to or higher than 70%, more preferably higher than 75%, still more preferably higher than 80%, by weight of the total weight of the mixture.

Preferably, above-mentioned turbomixer is a turbomixer manufactured by VOMM Impianti e Processi Spa, Italy and referred to as "Turbomixer".

Preferably, the step d) is performed for a time comprised between 10 and 60 seconds.

Preferably, the homogeneous paste formed in step d) has a relative humidity value comprised between 10 and 15%.

Preferably, the granulation step f) is performed at a temperature comprised between 120 and 270° C., preferably about 240° C.

Preferably, the granulation step f) is performed in a turbo-granulator manufactured by VOMM Impianti e Processi Spa, Italy.

Preferably, the step f) is performed for a time period comprised between 20 and 60 seconds, more preferably 30-50 seconds.

Preferably, the granules obtained in step f) have a size comprised between 250 μm and 5 mm diameter.

Preferably, at least about 70%, more preferably at least 80%, still more preferably at least 90%, of the granules have a size (in diameter) comprised between 500 μm and 5 mm. Preferably, the granules have a content of iron oxides comprised between 50 and 90%, preferably of 85%.

Preferably, such homogeneous paste obtained in step d) is passed from the turbomixer of step d) to the turbogranulator of step f) by an injector. Preferably, such injector is of the bladed and screw type.

Advantageously, such injector causes a physical separation between the content of the turbomixer of step d b) and the content of the turbogranulator of step f).

A mixer that is particularly suitable to carry out the steps a)-d) of the process described above consists of a so-called turbomixer equipment, comprising a cylindrical tubular body with a horizontal axis, provided with at least one opening for the introduction of the powder containing iron oxides, the optional carbon powder, the above-mentioned resin, and the optional catalyst, and at least one opening for the discharge of the mixed product, an optional heating or cooling jacket to bring the temperature of said tubular body to a predetermined temperature, a bladed rotor, rotatably supported in the cylindrical tubular body.

The turbogranulator mentioned above also comprises a cylindrical tubular body with a horizontal axis, provided with at least one opening for the introduction of the mixture exiting the turbomixer and at least one opening for the discharge of the end granules, a heating jacket, intended to be run by a heating fluid, e.g., diathermic oil, to bring the temperature of said tubular body to a predetermined temperature, and a bladed rotor, rotatably supported in the cylindrical tubular body.

The flow of thermosetting resin aqueous dispersion is preferably fed into the turbomixer in co-current with the flow of the iron oxide and carbon powders.

The rotational speed of the bladed rotor of the turbomixer preferably ranges between 150 and 300 rpm, advantageously between 200 and 250 rpm.

The residence time inside the turbomixer generally ranges between 10 seconds and 1 minute.

The paste that is formed in the turbomixer is fully homogeneous, so that each part thereof comprises all the component of the starting mixture in the desired proportions. For the purposes of the present invention, for the formation of the granules in the turbo-granulator, it is in fact crucial that the paste is homogeneous.

The rotational speed of the bladed rotor of the turbogranulator is preferably comprised between 250 and 700 rpm, advantageously between 300 and 600 rpm.

The residence time inside the turbogranulator is generally comprised between 30 seconds and 1 minute.

Preferably, an air flow, optionally heated air, is continuously fed in co-current with the paste flow into the turbogranulator, to promote the removal from the turbogranulator of the vapor formed due to the heating action of the heating jacket.

Preferably, the flow of paste exiting the turbomixer is transferred to the turbogranulator by a screw or bladed injector, which also acts as a hydraulic guard between the mixing and granulation steps.

The catalyst can be present in the mixture in an amount comprised between 3 and 10%, by weight of the total weight of the mixture.

The use of a catalyst is optional, since the temperatures reached in the granulation step are such as to cause the polymerization of the resin also in the absence of a catalyst. However, the catalyst allows obtaining the polymerization more quickly and at lower temperatures.

Compatibly with the resin compound pot-life, the catalyst can be mixed with the resin before the introduction into the turbomixer.

Of course, powders of metal elements and compounds used in the production of alloys (for example, manganese and aluminum), as well as melting and fluidification agents can also be added to the powder containing iron oxides and to the optional carbon powder.

The present invention also relates to a plant for implementing the above-mentioned process, essentially comprising a turbomixer as described above, a turbogranulator as described above, arranged downstream of the turbomixer, and an injector device arranged between the turbomixer and the turbogranulator and implementing a unidirectional fluid communication from the turbomixer to the turbogranulator. The injector device comprises a tubular body provided with an inlet opening, a discharge opening, and a bladed or screw rotor rotatably supported inside such tubular body.

The granules obtained with the process according to the invention have a specific weight comprised between 2 and 5 g/dm$^3$ and a content of iron oxide of about 85%.

The granules obtained with the process according to the invention are particularly strong and hard, and exhibit a size comprised between 250 µm and 5 mm. Generally, about 70%, about 80% or about 85% of the granules have a size comprised between 500 µm and 5 mm.

It has been found that with such sized the granules obtained with the process of the present invention are particularly suitable for use in magnetic induction furnaces. Their particular size and composition makes them at the same time highly strong and hard, and capable of melting efficiently.

The conversion of the iron oxide-containing powder into granules allows an advantageous transport of the material. In fact, it is known that iron oxide-containing powders with a relative humidity higher than about 15% have a thixotropic behavior, which makes the transportation of the mixture highly dangerous, especially in the case of a transport by ship.

Furthermore, the granulation, and particularly the treatment with thermosetting resins, makes the granule inert, hence exhibiting a low impact to the environment and the public health.

Thanks to the process and the plant of the present invention, it is therefore possible to transform the powders of iron oxides directly in situ, hence upgrading the waste powders of iron oxides that would otherwise be difficult to use. It follows an efficient disposal of the powders and the conversion thereof into a product that is marketable and easy to be transported.

When using thermosetting urea or urea-melamine resins, the additional advantage is obtained that during the treatment in the magnetic induction furnace, as well as in blast furnaces, of the granules according to the invention, ammonia vapors develop, which combine with NO$_x$ generated in the furnace to give nitrogen, thereby reducing the emissions of nitrogen oxides.

BRIEF DESCRIPTION OF THE DRAWINGS

Further characteristics and advantages of the present invention will be more clearly apparent from the following detailed description, given with reference to the single FIGURE attached (FIG. 1), which schematically shows a process plant for upgrading powders of waste iron oxides in accordance with the present invention.

DETAILED DESCRIPTION OF THE INVENTION

With reference to the above-mentioned FIGURE, an apparatus used for the process according to the present invention comprises a turbomixer essentially consisting of a cylindrical tubular body, closed at the opposite ends by end plates 2, 3, and co-axially provided with a heating/cooling jacket intended to be run by a fluid, for example, diathermic oil, to keep the inner wall of the body at a predetermined temperature.

The tubular body is provided with inlet openings 5, 6 and 10, respectively, 5 for the iron oxide powder and optionally the carbon powder, 6 for the thermosetting resin aqueous dispersion, and 10 for the catalyst, where used in the process, as well as an end paste discharge opening 7.

In the tubular body, a bladed rotor 8 is rotatably supported, the blades of which are arranged helicoidally and oriented to centrifuge and simultaneously conveying to the outlet the flows, the powders and the resin aqueous dispersion and the end paste, respectively.

A motor M is provided for actuating the bladed rotor at variable speeds of from 150 to 300 rpm.

When the paste exits the turbomixer, it is fed through a duct 11, in communication with the discharge opening 7 of the turbomixer, to the injector device 51.

The body of the injector device 51 is of a tubular shape and provided with an inlet opening 55, which receives the paste from the duct 11, and with an outlet opening 57.

In the tubular body 51, a bladed or screw rotor 58 is rotatably supported, which imparts the paste an advancement thrust towards the outlet opening 57, which directs the paste to the inlet opening 105 of a turbogranulator 101. The turbogranulator 101, having a structure completely similar to the structure of the turbomixer mentioned above, is not described in detail. The components of the turbogranulator that are the same as those of the turbomixer are indicated with the same reference numbers, increased by 100.

The granular product exiting the turbogranulator is directed to a container 18 for the collection and separation from the vapor and air also exiting the turbogranulator.

EXAMPLE

In the turbomixer 1, in which the bladed rotor 8 was rotated at a speed of 200 rpm, respective flows of powder containing iron oxides (100 kg/h), iron ore extraction waste, and carbon powder (10 kg/h) were continuously fed through the opening 5.

At the same time, through the opening 6, 15 kg/h of a urea-melamine resin aqueous dispersion (50% in water), and through the opening 10, 11 kg/h of a ammonium sulfate solution (50% in water) were continuously fed.

Immediately at the entrance of the turbomixer 1, the flows of powder containing iron oxides and carbon were mechanically dispersed in particles, which were immediately centrifuged against the turbomixer inner wall itself, where they formed a thin, fluid, tubular and dynamic layer. At the same time, the resin aqueous dispersion and the catalyst solution were finely atomized by the rotor 8 blades, which also brought about an immediate centrifugation of the tiny droplets obtained. These were thus introduced into the thin, fluid, tubular, dynamic layer of powder particles containing iron oxides and carbon powder, which they could intimately interact with.

After a residence time of about 40 seconds in the turbomixer, a paste was continually discharged from the opening 7, which originated from the intimate mixing of the above-mentioned powders with the resin aqueous dispersion. The paste at issue had a humidity content comprised between 10% and 20%.

This paste was continuously fed the turbogranulator 101, through the injector 51, in co-current with a flow of air at a temperature of 150° C. (500 m³/h flow rate).

In the turbogranulator 101, the wall temperature was controlled at a value of 220° C., while the rotational speed of the bladed rotor 108 was constantly maintained at 500 rpm.

After 45 seconds of average residence in the turbogranulator, a product in the form of spheroidal granules was continually discharged therefrom, which had a dry matter content of 98%. These granules had an ideal particle size curve, which indicated: the absence of powders, the absence of particle with a diameter<120 μm, 80% granules with a diameter>500 μm, and 7% granules with a diameter of about 5 mm.

The specific weight of the granules was 4 kg/dm³.

Experimental tests performed with the granules obtained according to the present example inside a magnetic induction furnace showed that the granules at issue, unlike the powders containing iron oxides from which they have been obtained, allow to easily obtain the melting inside the furnace and the recovery of the metal iron or the alloys thereof. Furthermore, a significant reduction of the nitrogen oxides $NO_x$ was observed compared to the melting processes in an magnetic induction furnace, performed on iron ores, due to the neutralizing effect of ammonia vapors developed from nitrogen resins contained in the granules.

The invention claimed is:

1. A process for upgrading a waste powder of the mining industry containing iron oxides, said process consisting of:
   a) providing a turbomixer consisting of a cylindrical tubular body with a horizontal axis, provided with at least one inlet opening and at least one discharge opening, an optional heating or cooling jacket to bring the temperature of said tubular body to a predetermined temperature, and a bladed rotor, rotatably supported in the cylindrical tubular body;
   b) feeding into said turbomixer in which the bladed rotor is rotated at a speed greater than or equal to 150 rpm
   a continuous flow of a powder based on iron oxides and optionally a continuous flow of carbon powder,
   a continuous flow of an aqueous dispersion of a thermosetting resin, which is dispersed in minute droplets,
   and a continuous flow of a solution of a catalyst of acidic nature to form a mixture;
   c) centrifuging said mixture against the turbomixer inner wall, with the formation of a fluid layer, in which the particles of powder based on iron oxides and optionally carbon powder, as well as the droplets of said thermosetting resin aqueous dispersion and said acid catalyst solution are mechanically kept in contact by the blades of said bladed rotor, while advancing in contact with said turbomixer inner wall toward the discharge opening;
   d) discharging from the discharge opening a continuous flow of a homogeneous mixture in the form of a paste containing said powder of iron oxides and optionally said carbon powder and said catalyst, embedded in said resin;
   e) granulating said homogeneous paste by
   providing a turbogranulator, consisting of a cylindrical tubular body with a horizontal axis, provided with at least one inlet opening and at least one discharge opening, a heating jacket to bring the temperature of said tubular body to a predetermined temperature, a bladed rotor, rotatably supported in the cylindrical tubular body;
   feeding said homogeneous paste into said turbogranulator through the at least one inlet opening, the turbogranulator inner wall being maintained at a temperature of 100-300° C. by means of said heating jacket and the bladed rotor being rotated at a speed of at least 250 rpm
   centrifuging and advancing said paste inside the turbogranulator by the action of said bladed rotor, which causes the formation of masses agglomerated by said thermosetting resin, which, upon centrifugation against the heated inner wall, crosslink to form spheroidal granules; and
   f) discharging a continuous flow of granules from the outlet opening of the turbogranulator;
   wherein said thermosetting resin is a urea resin or a urea-melamine resin and is present in said mixture in an amount between 3 and 10%, by weight of the total weight of the mixture.

2. The process according to claim 1, wherein said step of feeding said homogeneous paste into said turbogranulator is performed by directing, through a duct, said paste discharged from said discharge opening, to the inlet opening of an injector device, consisting of a tubular body, inside which is supported a bladed or screw rotor, which advances said homogeneous paste towards an outlet opening of said injector device, feeding it to at least one inlet opening of said turbogranulator.

3. The process according to claim 1, wherein the rotational speed of the bladed rotor of the turbomixer is between 150 and 300 rpm, and the residence time inside the turbomixer is between 10 seconds and 1 minute.

4. The process according to claim 1, wherein the rotational speed of the bladed rotor of the turbogranulator is between 250 and 700 rpm, and the residence time inside the turbogranulator is between 30 seconds and 1 minute.

5. The process according to claim 1, wherein said powder based on iron oxides is present in said mixture in an amount between 70 and 90% by weight of the total weight of the mixture.

6. The process according to claim 1, wherein said carbon powder is present in said mixture in an amount between 7 and 20% by weight of the total weight of the mixture.

7. The process according to claim 1, wherein said catalyst of acidic nature is an ammonium salt with a strong acid, and is present in said mixture in an amount between 3 and 10% by weight of the total weight of the mixture.

* * * * *